United States Patent
Palmer et al.

(10) Patent No.: US 7,493,300 B2
(45) Date of Patent: Feb. 17, 2009

(54) MODEL AND SYSTEM FOR REASONING WITH N-STEP LOOKAHEAD IN POLICY-BASED SYSTEM MANAGEMENT

(75) Inventors: John Davis Palmer, San Jose, CA (US); Sandeep Madhav Uttamchandani, San Jose, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 10/954,574

(22) Filed: Sep. 30, 2004

(65) Prior Publication Data

US 2006/0069863 A1 Mar. 30, 2006

(51) Int. Cl.
*G06F 17/00* (2006.01)
*G06N 5/00* (2006.01)

(52) U.S. Cl. .............. 706/56; 706/57; 706/21
(58) Field of Classification Search .......... 706/56, 706/57, 21; 718/1, 100; 700/1, 100
See application file for complete search history.

(56) References Cited

U.S. PATENT DOCUMENTS

| | | | |
|---|---|---|---|
| 5,479,414 A * | 12/1995 | Keller et al. ............ 714/726 |
| 6,233,590 B1 | 5/2001 | Shaw et al. |
| 6,430,712 B2 | 8/2002 | Lewis |
| 6,442,715 B1 | 8/2002 | Wilson |
| 6,532,454 B1 | 3/2003 | Werbos |
| 6,704,719 B1 | 3/2004 | Ericson |
| 2001/0051861 A1 * | 12/2001 | Tamura et al. ............ 703/13 |
| 2002/0174306 A1 * | 11/2002 | Gajjar et al. ............ 711/148 |
| 2003/0060898 A1 | 3/2003 | Jenkins et al. |
| 2003/0220899 A1 * | 11/2003 | Numanoi et al. ............ 707/1 |
| 2003/0225801 A1 * | 12/2003 | Devarakonda et al. ...... 707/205 |
| 2004/0015386 A1 | 1/2004 | Abe et al. |

OTHER PUBLICATIONS

John Wilkes, "Traveling to Rome: QoS Specification for Automated Storage System Management", Springer, 2001.*
Alvarez et al., Guillermo, "Minerva: An Automated Resource Provisioning Tool for Large-Scale Storage Systems", ACM, 2001.*
S.J. Beaty, "Lookahead Scheduling," ACM SIGMICRO vol. 23, Issue 1-2 (Dec. 1992).

(Continued)

*Primary Examiner*—David R Vincent
*Assistant Examiner*—Adrian L Kennedy
(74) *Attorney, Agent, or Firm*—Joseph P. Curtin, L.L.C.

(57) ABSTRACT

When an alarm condition relating to a performance goal of a storage system is detected, a storage management system invokes an N-step lookahead engine for simulating operation of the storage system when there are multiple actions that could be taken by the storage system for eliminating the alarm condition. The N-step lookahead engine generates N possible system states based on a current state of the storage system. The N possible states are based on a cost model of each of the multiple actions. Each cost model is based on an action, a behavior implication of the action, a resource implication of the action and a transient cost of the action. An action is selected that generates a system state that optimizes the stability, a prerequisite and a transient cost of invoking the selected action.

20 Claims, 7 Drawing Sheets

OTHER PUBLICATIONS

S. Chaudhuri et al. "AutoAdmin 'What-if' Index Analysis Utility," Proceedings ACM SIGMOD Conference Seattle 1998, pp. 367-378.

J.W. Janneck, "Generalizing lookahead-behavior prediction in distributed simulation", In: Parallel and Distributed Simulation, 1998.

M. Kallahalla et al., "Optimal prefetching and caching for parallel I/O systems," In ACM Symposium on Parallel Architectures and Algorithms, pp. 219-228, 2001.

E.J. Sandewall, "A Planning Problem Solver Based on Look-Ahead in Stochastic Game Trees," Journal of the ACM (JACM), vol. 16, Issue 3 (Jul. 1969).

M. Selter et al., "Self-Monitoring and Self-Adapting Operating Systems," In Proceedings of the Sixth Workshop on Hot Topics in Operating Systems, May 1997.

G. Valentin et al., "DB2 Advisor: An Optimizer Smart Enough To Recommend Its Own Indexes," available at http://www-106.ibm.com/developerworks/db2/library/techarticle/lohman/0107lohman.pdf.

T. Yeh et al., "Competitive analysis of on-line disk scheduling," Theory of Computing Systems, 31:491-506, 1998.

\* cited by examiner

MODEL AND SYSTEM FOR REASONING WITH N-STEP LOOKAHEAD IN POLICY-BASED SYSTEM MANAGEMENT

BACKGROUND OF THE INVENTION

1. Field of the Invention

The present invention relates to storage systems. More particularly, the present invention relates to a system and a method for managing a storage system.

2. Description of the Related Art

Policy-based management has been advocated as a panacea that will allow storage administrators to manage larger amounts of storage than are currently managed. For a policy-based management approach, system administrators specify high level policies (goals) with respect to performance, reliability, security, backup, restore, etc., and the storage management software uses a rule engine to automatically convert the high-level policies into low-level storage actions. As implemented, the responsibility of storage management has accordingly been transferred from system administrators to storage-management software providers. Storage management software providers must deal with complexity associated due to the presence of a large number of heterogeneous devices, business rules, users and storage management actions. Software providers also must ensure that their management software is general enough to handle changing workloads and system configurations, that is, not "brittle."

In complex storage environments, when a particular high-level goal is not being satisfied, there are potentially multiple storage management actions that can be taken for rectifying the problem. For a given system state, there can potentially be multiple rules that are applicable. Currently, rule-based systems handle such situations in an ad-hoc fashion by randomly selecting one of the available rules. It is not easy for the reasoning engine to a priori prioritize which particular storage management action to choose because each storage management action has complex side-affects that could potentially take the system into, for example, a thrashing mode or into sub-optimal states. Further, each respective action has a different cost associated with its invocation that must also be taken into account. A close analogy to this situation would be a chess match in which potential consequences of a particular move are not clear until many moves later. Consequently, chess players try to mentally analyze many moves ahead without actually making any moves.

N-step look-ahead algorithms are in use in Artificial Intelligence (AI) game theory domains, such as chess and checkers. N-step look-ahead algorithms are also in use in disk I/O scheduling and CPU instruction scheduling domains. Similarly, monitoring of real systems to create what-if analysis is currently being used in the database domain. Research relating to N-step look-ahead algorithms can be divided into three categories: (1) application domains of N-step lookahead; (2) monitoring information to create system models; and (3) N-step lookahead in Artificial Intelligence (AI) and planning.

In the category of application domains research, N-step lookahead implementations have domain-specific semantics for modeling and reasoning the actions within a system. For instance, traditional buffer management algorithms that minimize the number of I/O disk accesses for optimizing prefetching and caching in parallel I/O systems are substantially sub-optimal in a parallel I/O system in which multiple I/Os proceed simultaneously. See, for example, M. Kallahalla et al., "Optimal prefetching and caching for parallel I/O systems," In ACM Symposium on Parallel Architectures and Algorithms, pp. 219-228, 2001, which discloses an online algorithm with a global L-block lookahead that gives the buffer management algorithm a lookahead consisting of L distinct requests.

In S. J. Beaty, "Lookahead scheduling," ACM SIGMICRO Volume 23, Issue 1-2 (December 1992), a lookahead scheduling technique, the Data Dependence DAG (DDD), is disclosed for executing instructions. Additionally, according to Beaty, lookahead combined with other scheduling techniques can increase the likelihood of generating correct schedules.

Simulation in distributed systems is dependent on detection of model-inherent concurrency, which is related to the prediction of the future behavior of each logical simulation process. See, for example, J. W. Janneck, "Generalizing lookahead-behavior prediction in distributed simulation," In Proceedings of the twelfth workshop on Parallel and distributed simulation, pp. 12-19, 1998, which discloses a generalization of traditional approaches for behavior prediction using a lookahead algorithm.

For lookahead scheduling in disks, see, for example, T. Yeh et al., "Competitive analysis of on-line disk scheduling," Theory of Computing Systems, Vol. 31, pp. 491-506, 1998, which analyzes the problem of an on-line disk scheduling in which a look ahead at the next k variables that are to be read can be performed and from that knowledge, the order in which to read the variables from the disk can be selected for minimizing the seek start-up time.

In the category of monitoring information to create system models; M. Selter et al., "Self-Monitoring and Self-Adapting Operating Systems," In Proceedings of the Sixth Workshop on Hot Topics in Operating Systems, May 1997, discloses Vino, a self-monitoring and self-adapting operating system that performs continuous monitoring of operating system activity to construct a database of performance statistics. The data is classified appropriately and off-line analysis is performed for constructing a characterization of the system under normal behavior and for detecting anomalous behavior. The component adaptations are all predetermined, fixed implementations.

In the domain of databases, approaches such as SMART and AutoAdmin use query optimizers that can reason about the "what if" scenarios for automated index selection in databases. For the SMART implementation, see, for example, G. M. Lohman et al., "DB2 Advisor: An optimizer Smart Enough to Recommend Its Own Indexes," Proceedings, 16th IEEE Conference on Data Engineering, San Diego, Calif., 2000. For AutoAdmin, see, for example, S. Chaudhuri et al., "AutoAdmin 'What-if' Index Analysis Utility," Proceedings ACM SIGMOD Conference, Seattle 1998, pp. 367-378. The SMART system is continuously monitored and the performance of each query recorded. The optimizer uses past history to create the cost model for the operations in the query, which is then used to refine the execution plans.

In the category of AI and Planning theory, the concept of lookahead has been used extensively in game-theory, which is the science of strategy, and attempts to determine mathematically and logically the actions that "players" should take to secure the best outcomes for themselves in a wide array of "games." The games studied range from chess to child rearing and from tennis to takeovers. But the games all share the common feature of interdependence. That is, the outcome for each participant depends upon the choices (strategies) of all. Deep Blue, for example, was built to examine 200 million possible moves per second and to look ahead as many as fourteen turns of play (considering all the permutations of the adversary moves). The lookahead algorithm is combined with search algorithms, such as A*, Simulated Annealing, Hill-climbing, and Forward pruning. See, for example, P.

Norvig, Paradigms of AI Programming: Case Studies in Common Lisp, 1991, and H. -D. Bocker et al., "Interactive Problem Solving Using Log."

Planning theory is generally referred to in the context of robotics, artificial intelligence, and control theory. Within robotics, the focus is on designing algorithms that generate useful motions by processing complicated geometric models. Within artificial intelligence, the focus is on designing systems that use decision-theoretic models compute appropriate actions. Within control theory, the focus of the presentation is on algorithms that numerically compute feasible trajectories or even optimal feedback control laws. There are multiple approaches for lookahead in each of these domains. Interesting techniques for mapping lookahead algorithms in game theory as search heuristics in planning algorithms are described in E. J, Sandewall, "A Planning Problem Solver Based on Look-Ahead in Stochastic Game Trees," Journal of the ACM (JACM), Volume 16, Issue 3, July 1969.

Consequently, what is needed is a technique for managing a storage system that, in response to an alarm condition, selects an action that optimizes the stability of a storage system, a prerequisite of the storage system and a transient cost of invoking the selected action.

BRIEF SUMMARY OF THE INVENTION

The present invention provides a technique for managing a storage system that, in response to an alarm condition, selects an action that optimizes the stability of a storage system, a prerequisite of the storage system and a transient cost of invoking the selected action.

The advantages of the present invention are provided by a method of managing a storage system in which an alarm condition relating to a performance goal of the storage system is detected. An N-step lookahead engine is invoked for simulating operation of the storage system when there are multiple actions that could be taken by the storage system for eliminating the alarm condition. N possible system states are generated based on a current state of the storage system. Each of the N possible states are generated based on a cost model of each of the multiple actions. Each cost model is based on an action, a behavior implication of the action, a resource implication of the action and a transient cost of the action. An action is selected that generates a possible system state that optimizes a stability of the storage system, a prerequisite of the storage system and a transient cost of invoking the selected action. The selected action is then invoked. The N-step lookahead engine is terminated when a current state of the storage system is greater than a predetermined difference from a state of the storage system when the N-step lookahead engine was invoked, and the N-step lookahead engine is re-invoked for simulating operation based on the current state of the storage system.

In one exemplary embodiment of the present invention, the N possible system states that are stored can be stored. Accordingly, it is determined whether a current state of the storage system causing the alarm condition is similar to an earlier state of the storage system when the alarm condition is detected. If so, an action is selected from memory, the selected action being previously selected when the state of the storage system was similar to the current state of the storage system.

The present invention also provides a system for managing a storage system. The system includes sensors, a storage management system and a database storing the N possible system states. The sensors detect an alarm condition relating to a performance goal of the storage system. The storage management system invoke an N-step lookahead engine for simulating operation of the storage system when there are multiple actions that could be taken by the storage system for eliminating the alarm condition. The N-step lookahead engine generates N possible system states based on a current state of the storage system. The N-step lookahead engine generates each possible state based on a cost model of each of the multiple actions. Each cost model is based on an action, a behavior implication of the action, a resource implication of the action and a transient cost of the action. The storage management system selects an action that generates a possible system state that optimizes a stability of the storage system, a prerequisite of the storage system and a transient cost of invoking the selected action. The storage management system also invokes the selected action. The storage management system terminates the N-step lookahead engine when a current state of the storage system is greater than a predetermined difference from a state of the storage system when the N-step lookahead engine was invoked, and re-invokes the N-step lookahead engine for simulating operation based on the current state of the storage system.

When the storage management system determines that a current state of the storage system causing the alarm condition is similar to an earlier state of the storage system when the alarm condition is detected, the storage management system selects an action stored in the database that was previously selected when the state of the storage system was similar to the current state of the storage system.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

Conventional storage management systems access the current state of a system, and then take actions to go towards a more favorable state. In contrast, the present invention provides a look-ahead paradigm for storage management that, based on the current system state, actions are taken that take the system to a new hypothetical state. The number of times the hypothetical actions can be applied in a recurring manner can be controlled as a system parameter. The approach of the present invention, referred to herein as an N-step lookahead approach, keeps track of hypothetical system states by simulating all of the relevant system observables. Finally, after N actions are simulated, the present invention chooses the best available action based on the N-step lookahead simulation and applies the selected action to the current real state of the system.

The N-step look-ahead mechanism of the present invention is fully integrated with a reasoning engine. The set of rules that are available for execution also include rules that have been enabled due to transitions to hypothetical system states. The behavior of the underlying physical system is modeled for when the system is simulated. Accordingly, the system model used by the present invention is not static in nature. That is, the model evolves as it is updated by a learning engine. The predictions of the N-step look-ahead approach can, nevertheless, lead the system to sub-optimal states due to changes in external factors such as addition of new users and new devices, failure of system components, changes in assigned goals during the time the N-step look-ahead simulation is taking place. Consequently, a simulation is terminated and another simulation started when it is determined that current state of the real system has become too far away from the previously assumed starting state of the simulation.

Figure 1:
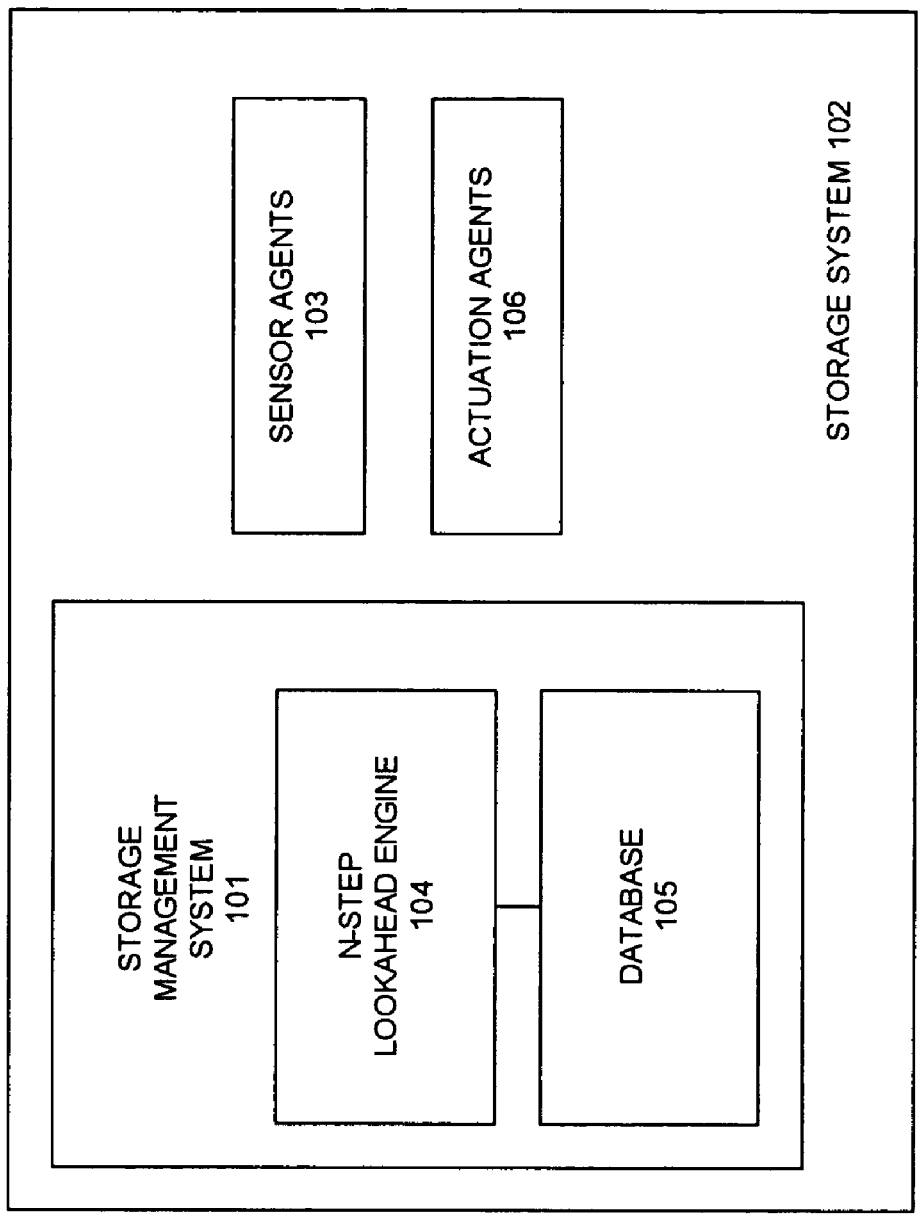
FIG. 1 depicts a functional block diagram of a storage management system and a storage system according to the present invention.

FIG. 1 depicts a functional block diagram of a storage management system 101 and a storage system 102 according to the present invention. Storage management system 101 is typically not in the direct data path of storage system 102. Storage management system 101 monitors storage system 102 via sensor agents 103. Storage management system 101 analyzes and plans the corrective actions to take when a storage system performance problem is sensed. Storage system 102 either directly or indirectly via storage management system 101 monitors various system resources via sensor agents 103. Sensor agents 103 raise alerts when the resources that are being monitored exceed predefined threshold values. The alerts are sent to storage management system 101.

In response to an alert, storage management system 101 determines whether there are multiple competing actions that are possible to rectify the problem causing the alert. When there are multiple actions, storage management system 101 invokes a simulation engine, N-step lookahead engine, 104, that models the operation of memory system 102 based on inputs received from storage management system 101. Outputs generated by N-step lookahead engine 104 are stored in a simulation output database 105. Initially, N-step lookahead engine 104 checks to see whether the current state is similar to other states that have been dealt with in the past, and if there is a similar state, the corrective actions taken in the past are retrieved from database 105 and outputs the previously taken corrective actions to storage management system 101. When the current state of storage system 102 is a new state, then N-step lookahead engine 104 starts a simulation. N-step lookahead engine 104 executes the simulation of a depth of "N," which is specifiable by the user. Deeper simulation depths provide a better analysis of side-effects of potential corrective actions. Actuation agents 106 are used for taking a selected corrective action.

Figure 2:
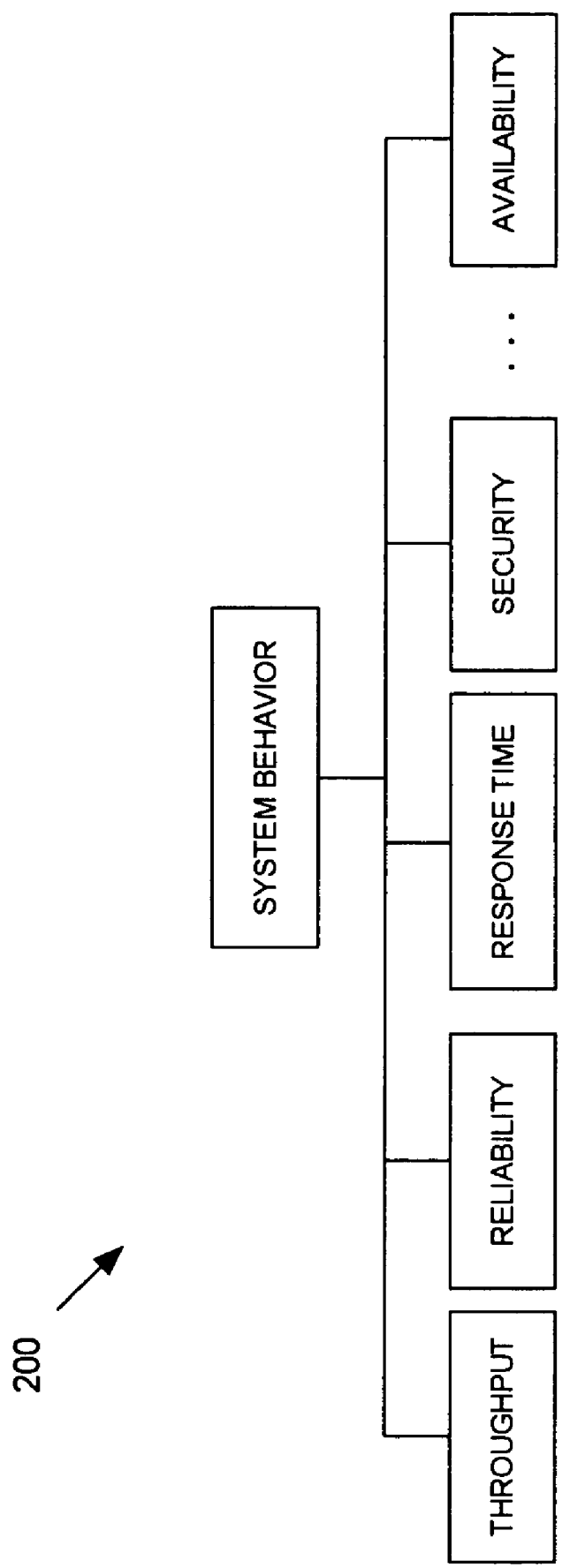
FIG. 2 depicts an exemplary system behavior that is composed of throughput, reliability, response time, security and availability.

The techniques of the present invention are applicable for both rule-based policy-management and for declarative-type approaches. The operation of the present invention can be divided into three parts: analysis of cost models for associated actions, N-step lookahead engine analysis, and a reasoning engine analysis. A cost model of an action is a composition of its behavior implication and its resource implication. To simplify cost models, the present invention handles cost models as separate functions. Every system has actions that can change its behavior. The term "behavior," as used herein, represents the observable characteristics of a system. The characteristics can be specified using abstractions, such as Quality of Service (QoS) goals, transactions properties, etc. For example, FIG. 2 depicts an exemplary system behavior 200 that is composed of throughput, reliability, response time, security and availability. The term "system-state," as used herein, represents details of a system, namely resource utilizations, system events and workload characteristics. Resource utilization is expressed in terms of cpu, I/O and network bandwidth being used. System events can specify system conditions, such as a disk being 95% full, or errors, such as network failures or disk failures. Workload characteristics include read-write ratio, sequential/random, etc.

The impact on action is a function of the current state and current behavior, i.e., increasing a memory resource from 256 MB to 512 MB has a different impact than increasing the same memory resource from 512 MB to 1 GB. Similarly, to change a latency from 8 msec to 4 msec requires a different system impact than from changing a latency from 4 msec to 2 msec.

The behavior implication b on an action defines the impact that an action has on system behavior. In particular, behavior implication b is defined as b(Current State, Current Behavior, % invocation value)→% Change in Behavior. Behavior implication b is a complex function dependent on parameters, such as the current behavior, the current system state, and the degree of invocation of the action. Current behavior of a system consists of parameters, such as throughput, latency, availability, and security. Similarly, the system state is a snapshot of resources and application access pattern, each of which is a collection of multiple variables. Generally, an action is related to a small subset of these variables. A few of the variables of the subset could be the primary or intended effect while other variables of the subset could be the side effects. For example, prefetching generally has a primary effect on throughput, a side-effect on latency, and does not possibly affect security in any fashion.

The resource implication r of an action is defined as r(Current state, % invocation value)→New System state. The impact of an action on system-state is mainly quantified in terms of resources, i.e., there are second-order effects on the observed workload characteristics, but the effects can be ignored for simplicity. The resource implication r is fairly straightforward in comparison to the behavior implication b.

In addition to the implications functions, each action has an associated variable to denote the transient overhead of invoking the action. It is possible to derive transient cost C values by monitoring a system and measuring the overhead of each action on each of the system resources. For simplicity, the present invention categorizes the overhead of an action into a class and assigns numerical values of 1, 10 and 100 to respectively signify low, medium and high overheads. Thus, the transient overhead variable is a rough estimate and categorizes the action into a class rather than precisely measuring the overheads, which would add to the complexity because the overhead for a few actions is a function of the amount of data involved. The transient cost value is assigned via a specification.

There are two possible ways to derive cost-model functions. In the case of a rule-based system, cost-model functions are derived solely by learning. The search space may, though, be large and the number of iterations required could be accordingly high, but it is still a feasible approach for deriving cost-model function. Another possibility for deriving cost-model functions is by using declarative specifications for defining actions. In this second approach, specifications form the blueprint for the learning process and help in monitoring and recording parameters that are relevant for the particular action.

Consider the example of a prefetch action. In a rule-based system, there are rules that invoke a prefetch action. Three exemplary rules for invoking such a prefetch action are illustrated below. Each time an action is invoked, system parameters are recorded and added to a data set of a learning algorithm that is used for interpolation.

```
Event: Latency_not_met
If {(Memory_available > 70 && FC_interconnect_available > 60)
   && (access_pattern < 0.4 sequential && read/write > 0.4)}
    Prefetch = 1.2*Prefetch
Event: Latency_not_met
If {(15 < Memory_available > 70 && FC_interconnect_available > 60)
   && (access_pattern > 0.7 sequential && read/write > 0.4)}
    Prefetch = 1.4*Prefetch
Event: Latency_not_met
If {(Memory_available > 70 && FC_interconnect_available > 60)
   && (0.4 < access_pattern < 0.7 sequential && read/write > 0.4)}
    Prefetch = 1.3*Prefetch
```

Declarative specifications use a specification as a blueprint for the cost model. The cost model is then successively refined by adding information each time the action is invoked. For example, the specification model classifies the properties of the actions into two groups: a Meta-level attributes and Base-level attributes.

Meta-level attributes are used by the reasoning engine to select among the several competing actions. The attributes that fall under Meta-level include Behavior implications and Preconditions. Behavior implications enumerate the impact of an action on the different observables. In the specification, the administrator provides this information not quantitatively, but using descriptive terms, such as up, down, and none. For example, <implication dimension=throughput impact=up>. Preconditions describe the dependencies of the action on the resources and workload characteristics. For example, <precond dimension=memory, value=*>.

Base-level attributes include details for functions and parameters used for invoking an action. For example, <function name=change_prefetch_size>. The functions and parameters can be expressed using existing standards, such as SMI-S.

For purposes of N-step lookahead, only the meta-level attributes are relevant. Exemplary specifications for prefetching include:

```
<action name = PREFETCH >
<behavior_implications>
<implication dimension = throughput impact = up >
</behavior_implications>
<preconditions>
<precond dimension = sequential/random ratio value = high >
<precond dimension = read/write ratio value = high >
<precond dimension = memory value = * >
<precond dimension = fc_bandwidth value = * >
</preconditions>
<Overhead function = low>
```

Each time an action is invoked within a rule, the information is recorded in the context of the rule.

The learning engine can leverage conventional-type machine learning algorithms to refine the cost models. In the artificial intelligence domain, learning algorithms are treated as a black box that interpolates information for the (n+1)th data point given a previous sample of n data points. In the case of rule-based systems, learning is based on Case-Based Reasoning (CBR) in which a "system snapshot" is recorded for every action invocation. Alternatively, learning can involve adding information to meta-level attributes in the specification. For implications, the impact of invoking an action on the observable goals is quantified, such as increasing pre-fetching by 20% improved throughput by 8%. For preconditions, the threshold values used for the invocation of actions are remembered, such as invoking pre-fetching with available memory less than 20% has a negative impact on performance. Also, the percentage of resources used as the function of the percentage change in invocation value can be remembered.

One of the non-trivial tasks in setting up a learning function is to define the parameters on which the learning function depends. For example, in the case of prefetching, the throughput implication is a function of change in the value of prefetch size, the current value of the observable (i.e., throughput), current value of the resource-state (e.g., available memory, and workload characteristics (e.g., sequential/random ratio).

Figure 3:
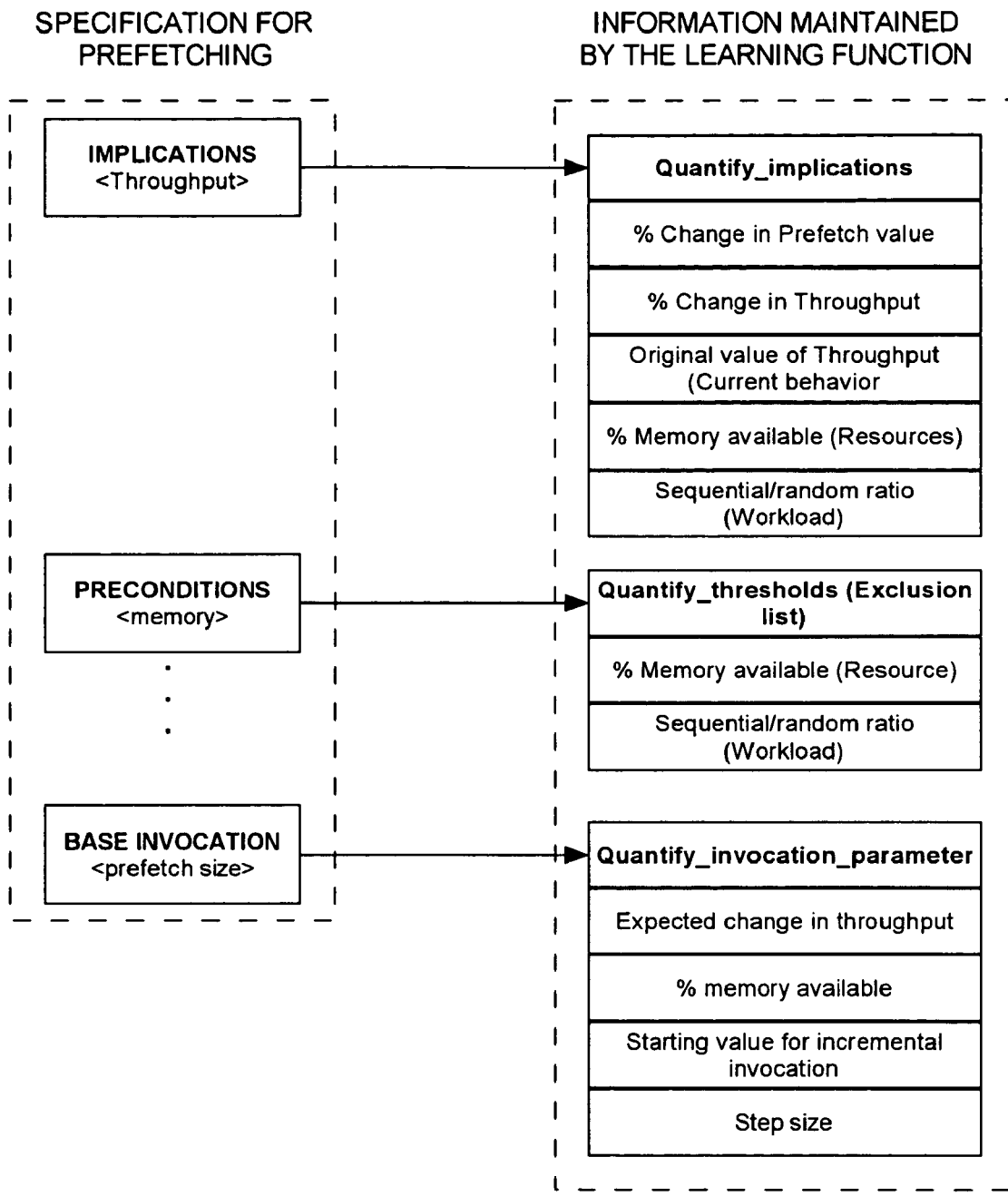
FIG. 3 represents exemplary parameters recorded by the learning module of the present invention for quantifying attributes for prefetch specifications.

FIG. 3 represents exemplary parameters recorded by a learning engine of the present invention for quantifying attributes for prefetch specifications. The parameters for the learning function are derived from the specifications, i.e., the resources that are monitored, and the workload characteristics that are measured for a given action. In particular, the present invention employs Case Base Reasoning as a learning algorithm for implications and preconditions. For the base invocation, the present invention uses re-enforcement learning using neural nets.

Figure 4:
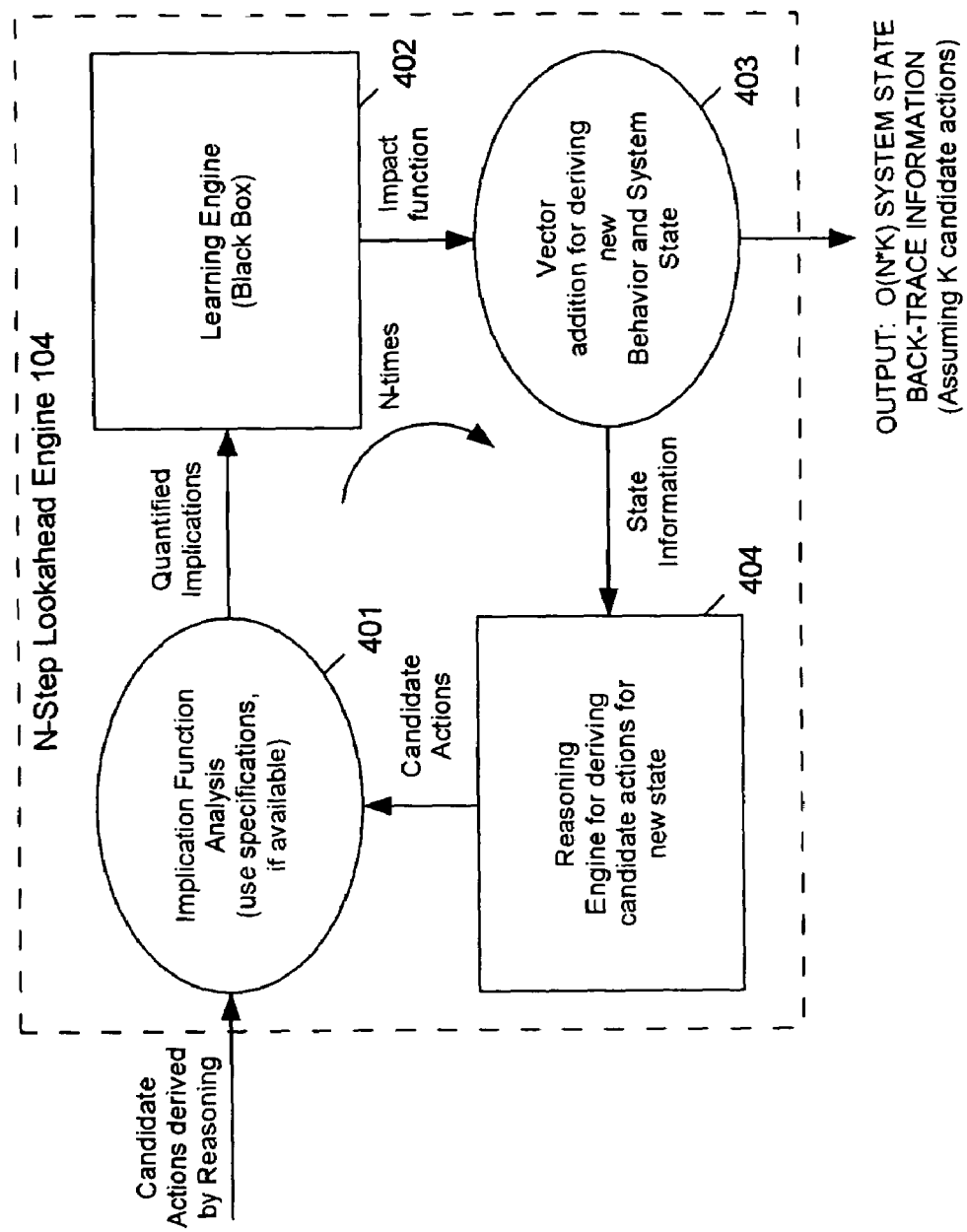
FIG. 4 depicts the functional blocks of a N-step lookahead module according to the present invention.

FIG. 4 depicts the functional blocks of an N-step lookahead module 104 according to the present invention. N-step lookahead module 104 includes Cost-Function Analyzer 401, a Learning Engine 402, a Behavior and System State Developer 403, and Reasoning Engine 404. The input to the N-step lookahead module 104 includes a list of k candidate actions that are generated by the first iteration of the reasoning engine 404. Thereafter, the N-step lookahead module iteratively generates the possible system states for each of the k candidate actions; the output from N-step lookahead module 104 is O(k*N) possible system states. For each state, the back trace path, the total cost of the path and the number of iterations required to reach each state are recorded.

Figure 5:
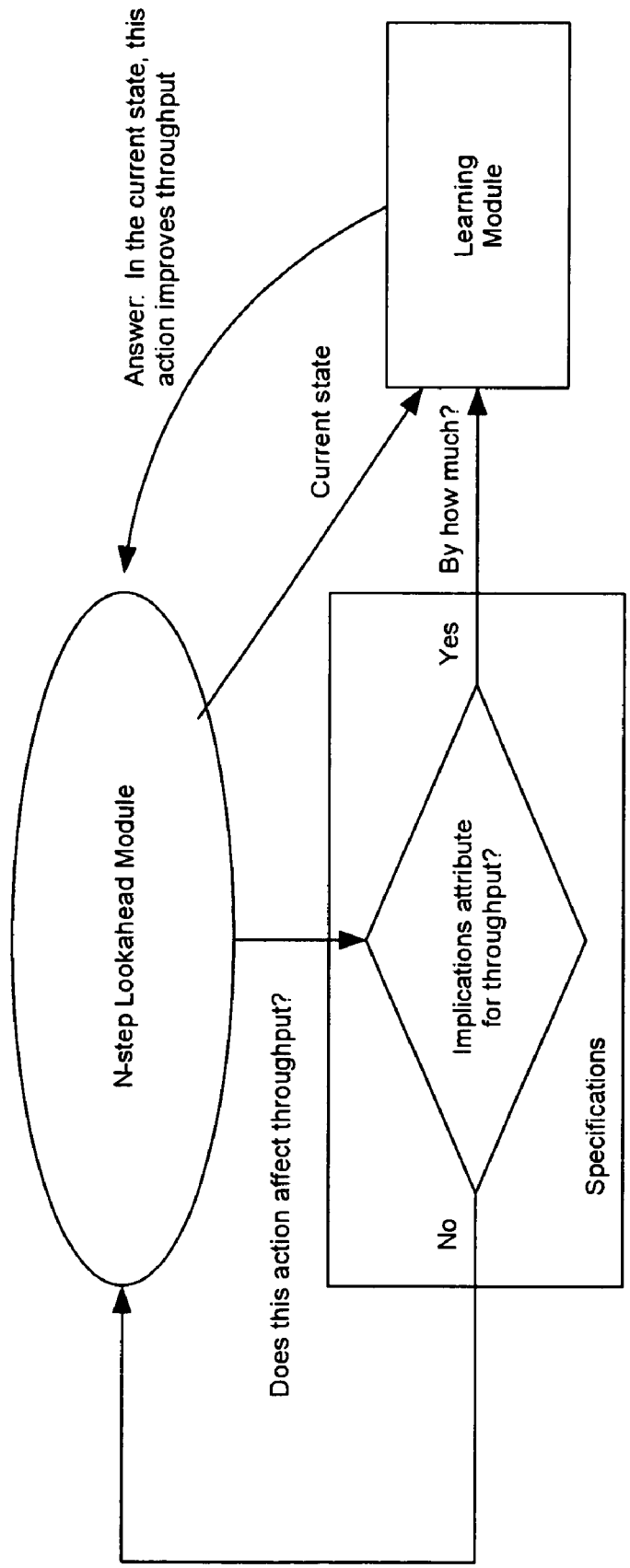
FIG. 5, which depicts an interaction between a cost model specification and information derived by the reasoning engine according to the present invention.
Figure 6:
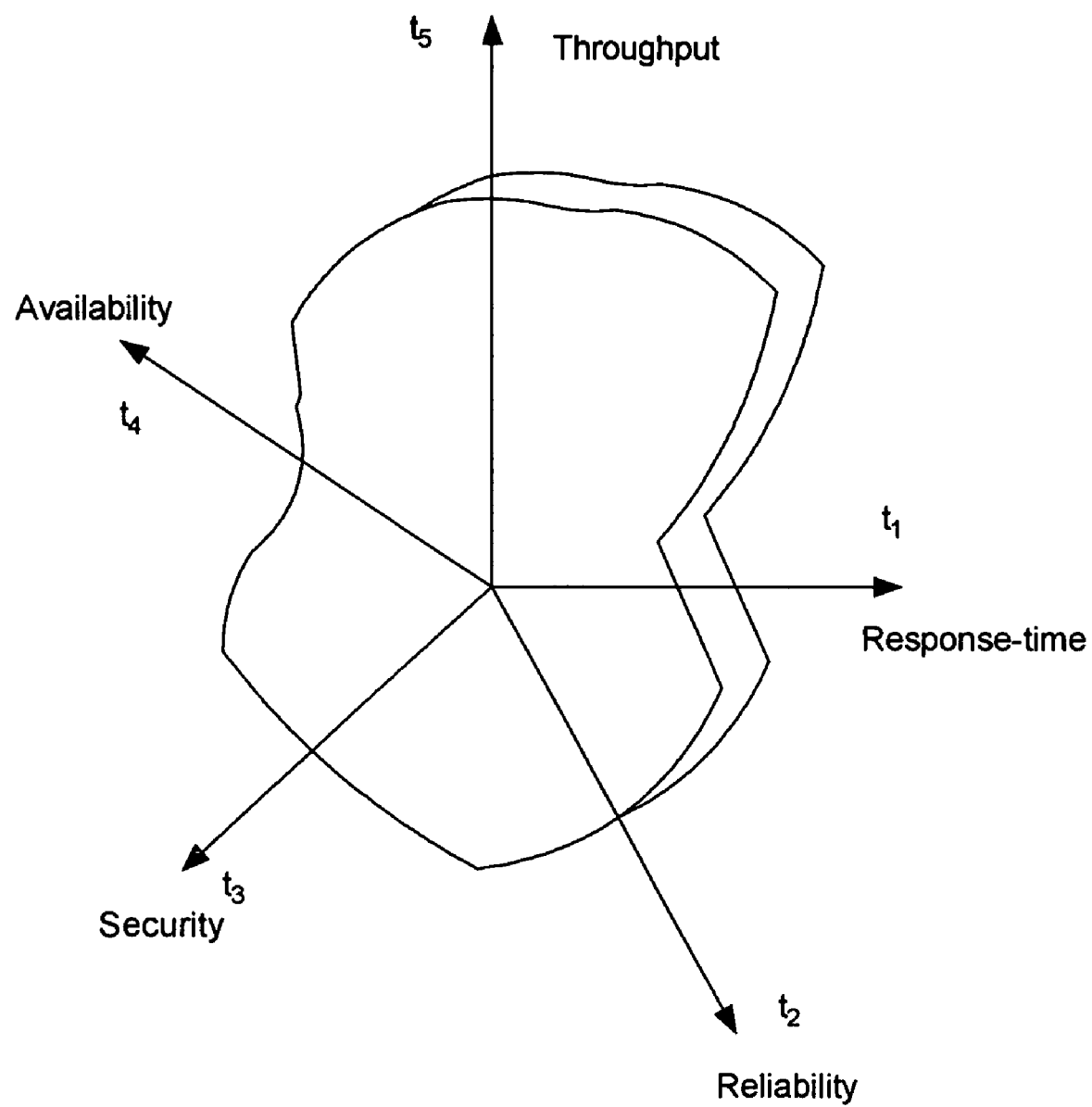
FIG. 6 depicts the behavior and resource implication functions represented as vectors within an n-dimensional behavior space.

After receiving the k candidate actions, Cost-Function Analyzer 401 derives the cost functions for each action. Each cost function is a triplet <b, r, Overhead variable> having values that are a function of the current behavior and system state. In the case of a rule-based system, cost functions are derived by using Learning Engine 402 only, that is, there are no specifications for the action model. Alternatively, cost functions can be derived by using a combination of the specifications and the data collected by Learning Engine 402. For example, the interactions between the specifications and learning components are shown in FIG. 5, which depicts an interaction between a cost-model specification and information derived by Reasoning Engine 404 according to the present invention. Learning Engine 402 complements the specifications by interpolating values for the attributes. Next, Behavior and System State Developer 403 applies the cost-model functions of each respective candidate action in order to derive new values for Behavior and System states as a vector addition operation. FIG. 6 depicts the behavior and resource implication functions represented as vectors within an n-dimensional behavior space.

As an example, the behavior implication of the data-replication rule is a vector along the dimensions of throughput, latency and availability. The vector is represented as: B(data-replication)=[(0.3)Throughput−(0.1)Latency+(0.2)Availability] in which invoking replication improves throughput and availability by 30% and 20%, respectively, and degrades latency by 10%.

At the end of each iteration, there are O(x*K) possible system states in which x is the iteration depth and K is the cardinality of the initial set of candidate actions. For each iteration, the new state (resource and behavior)+assigned goals is input to Reasoning Engine 404 in order to output the next set of candidate actions. It is quite possible that Reasoning Engine 404 does not apply any candidate actions. Such as state is referred to as the "terminal" state and occurs when the following is true within a state:

All the assigned goals are being met, AND there are no resource threshold events.

Note that N-step lookahead module 104 is parallelizable, i.e., each path can be calculated in parallel by K agents that each correspond to the candidate actions. The outcome of each of the agents is combined and input to the Reasoning Engine 404.

Figure 7:
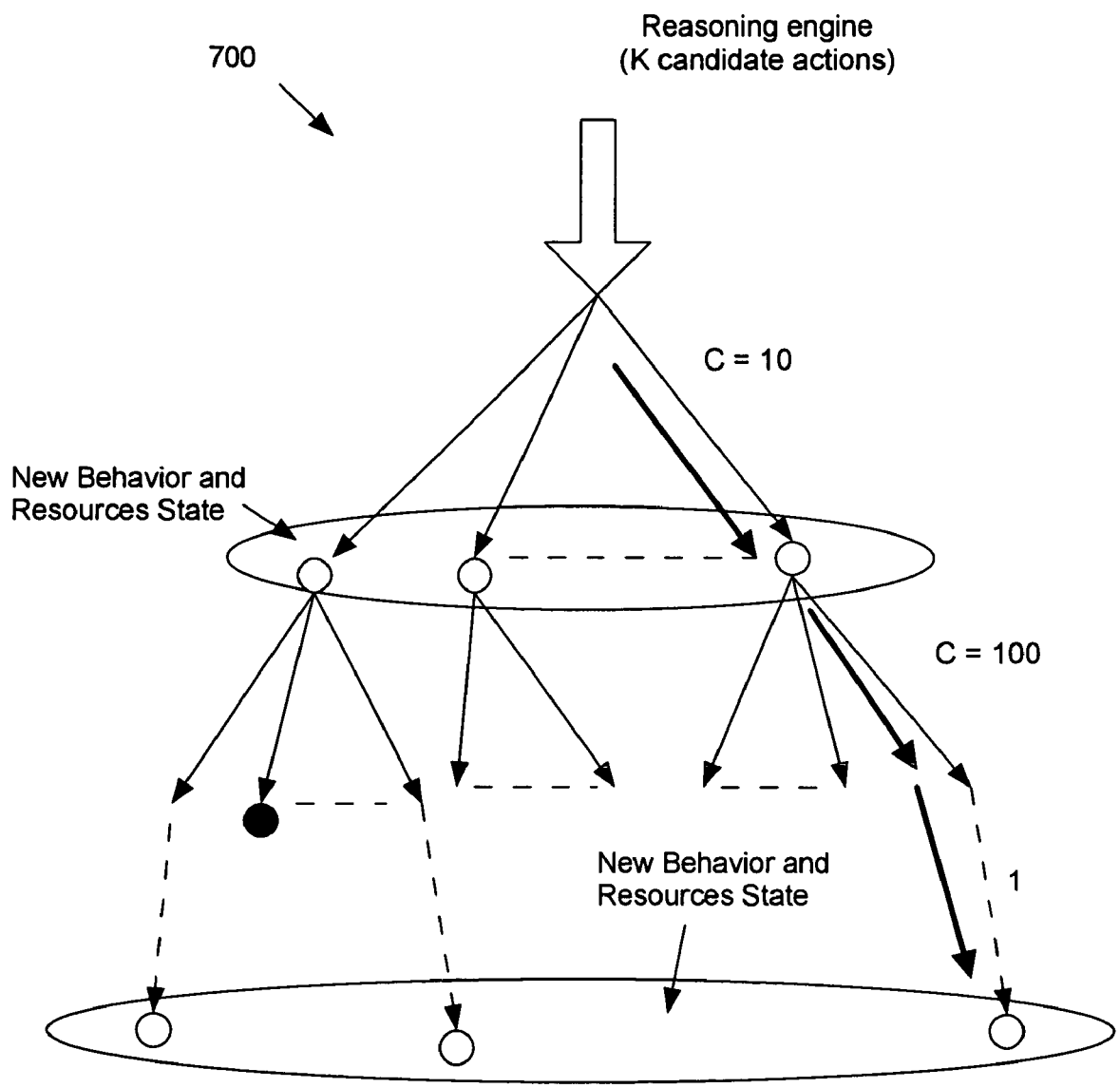
FIG. 7 depicts a back-trace tree for a O(x*K) possible system states derived by N-step lookahead module according to the present invention.

At the end of N-iterations, the O(K*N) system states are input to Reasoning Engine 404 along with the back-trace path for each path, the total cost of each path, and the number of iterations required to reach the state. Reasoning Engine 404 uses optimization functions to decide the "optimal" path within a back-trace tree that meets the Pre-requisites and optimizes the Stability and Transient Cost functions. FIG. 7 depicts a back-trace tree 700 for a O(x*K) possible system states derived by N-step lookahead module 104. Each system state is represented by a circle. An empty circle represents an intermediate system state. A black, or filled, circle represents a terminal state. Exemplary transient costs C are also depicted in FIG. 7.

By optimizing the Stability function, the most "stable" system state is produced in terms of behavior and resource implications. "Stable" is defined herein as a dot product between the Goals and the Current-state (represented as vectors within an n-dimensional vector space). By optimizing the Transient Cost Function, the lowest transient costs are incurred for invocation of an action. By optimizing the Pre-requisite, patterns are avoided, such as chain invocation of actions (reflected as number of iterations), and repeated invocation of the same action.

The Transient Cost function C is calculated for each path by simple addition of all the edges in the path. Successive invocation of the same action is then checked and when detected a RepeatFlag is set to be True. The number of iterations/actions I invoked within the path are calculated. The dot product of the state (for each path) and the goals is calculated. The dot product is the cosine of the angle between the vectors S. The paths are sorted in descending order on the value of S. The top x % of the paths are preserved from the sorted list, and the paths having RepeatFlag=True filtered, i.e., removed from the list. The shortlisted paths are re-sorted in ascending order for C. The first element of the list and back-trace its path are selected. The outcome of the N-step lookahead function is the starting candidate action of the selected path.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A processor-based method of managing a hardware storage system, comprising:
   detecting an alarm condition relating to a performance goal of the hardware storage system;
   invoking an N-step lookahead engine for simulating operation of the hardware storage system if there are multiple candidate actions that could be taken by the hardware storage system for eliminating the detected alarm condition;
   generating N simulated storage system states for each of the candidate actions based on a current system state of the hardware storage system, each simulated storage system state comprising at least one of a storage system resource utilization, a storage system event and a storage system workload characteristic;
   selecting a candidate action that generates a simulated storage system state that optimizes a stability of the simulated storage system based on eliminating the detected alarm condition, a prerequisite of the hardware storage system and a transient cost of invoking the selected candidate action, the transient cost being based on an overhead cost of the selected candidate action on resources of the hardware storage system; and
   outputting the selected candidate action to the hardware storage system for managing the hardware storage system based on the detected alarm condition.

2. The method according to claim 1, further comprising invoking the selected candidate action.

3. The method according to claim 1, further comprising storing the N simulated storage system states for each of the candidate actions.

4. The method according to claim 1, further comprising:
   determining whether the current system state of the hardware storage system causing the alarm condition is similar to an earlier system state of the hardware storage system when the alarm condition is detected;
   selecting a candidate action from memory, the selected candidate action being previously selected when the system state of the hardware storage system was similar to the current system state of the hardware storage system.

5. The method according to claim 1, wherein generating the N simulated storage system states generates each simulated storage system state based on a cost model of each of the multiple candidate actions.

6. The method according to claim 5, wherein each cost model is based on a candidate action, a behavior implication of the candidate action, a resource implication of the candidate action and the transient cost of the candidate action.

7. The method according to claim 1, wherein generating the N simulated states generates each simulated storage system state based on a rule-based system.

8. The method according to claim 1, wherein generating the N simulated storage system states generates each simulated storage system state based on at least one specification.

9. The method according to claim 1, wherein N is user selectable.

10. The method according to claim 1, further comprising:
    terminating the N-step lookahead engine when the current system state of the hardware storage system is greater than a predetermined difference from the system state of the hardware storage system when the N-step lookahead engine was invoked; and
    re-invoking the N-step lookahead engine for simulating operation based on the current system state of the hardware storage system.

11. A processor-based system for managing a hardware storage system, comprising:

sensors detecting an alarm condition relating to a performance goal of the hardware storage system; and a storage management system invoking an N-step lookahead engine for simulating operation of the hardware storage system if there are multiple candidate actions that could be taken by the hardware storage system for eliminating the detected alarm condition, the N-step lookahead engine generating N simulated storage system states for each of the candidate actions based on a current system state of the hardware storage system, each simulated storage system state comprising at least one of a storage system resource utilization, a storage system event and a storage system workload characteristic, the storage management system selecting a candidate action that generates a simulated storage system state that optimizes a stability of the simulated storage system based on eliminating the detected alarm condition, a prerequisite of the hardware storage system and a transient cost of invoking the selected candidate action, the transient cost being based on an overhead cost of the selected candidate action on resources of the hardware storage system.

12. The system according to claim 11, wherein the storage management system invokes the selected candidate action.

13. The system according to claim 11, further comprising a database storing the N simulated storage system states.

14. The system according to claim 13, wherein the storage management system determines whether the current system state of the hardware storage system causing the alarm condition is similar to an earlier state of the hardware storage system when the alarm condition is detected and selects a candidate action stored in the database that was previously selected when the state of the hardware storage system was similar to the current system state of the hardware storage system.

15. The system according to claim 11, wherein the N-step lookahead engine generates each simulated storage system state based on a cost model of each of the multiple candidate actions.

16. The system according to claim 15, wherein each cost model is based on a candidate action, a behavior implication of the candidate action, a resource implication of the candidate action and the transient cost of the candidate action.

17. The system according to claim 11, wherein the N-step lookahead engine generates each simulated storage system state based on a rule-based system.

18. The system according to claim 11, wherein the N-step lookahead engine generates each simulated storage system state based on at least one specification.

19. The system according to claim 11 wherein N is user selectable.

20. The system according to claim 11, wherein the storage management system terminates the N-step lookahead engine when the current system state of the hardware storage system is greater than a predetermined difference from the system state of the hardware storage system when the N-step lookahead engine was invoked, and re-invokes the N-step lookahead engine for simulating operation based on the current state of the hardware storage system.

* * * * *